US008190671B2

(12) United States Patent
Torma

(10) Patent No.: US 8,190,671 B2
(45) Date of Patent: May 29, 2012

(54) ARRANGING SYNCHRONIZATION SESSION

(75) Inventor: Marko Torma, Nokia (FI)

(73) Assignee: Nokia Corporation, Espoo (FI)

( * ) Notice: Subject to any disclaimer, the term of this patent is extended or adjusted under 35 U.S.C. 154(b) by 927 days.

(21) Appl. No.: 10/712,232

(22) Filed: Nov. 12, 2003

(65) Prior Publication Data

US 2004/0117507 A1    Jun. 17, 2004

(30) Foreign Application Priority Data

Nov. 13, 2002  (FI) .................................... 20022024

(51) Int. Cl.
*G06F 15/16* (2006.01)
(52) U.S. Cl. ........................................ 709/203; 709/248
(58) Field of Classification Search .................. 709/203
See application file for complete search history.

(56) References Cited

U.S. PATENT DOCUMENTS

| 5,727,202 | A | * | 3/1998 | Kucala ............................ 707/10 |
| 5,884,323 | A | * | 3/1999 | Hawkins et al. ............... 707/201 |
| 5,974,238 | A | * | 10/1999 | Chase, Jr. ....................... 709/248 |
| 5,991,771 | A | * | 11/1999 | Falls et al. ....................... 707/202 |
| 6,272,545 | B1 | * | 8/2001 | Flanagin et al. ............... 709/228 |
| 6,330,618 | B1 | * | 12/2001 | Hawkins et al. ............... 709/248 |
| 6,748,403 | B1 | * | 6/2004 | Lemke .......................... 707/202 |
| 7,788,382 | B1 | * | 8/2010 | Jones et al. .................... 709/227 |

| 2001/0056442 | A1 | * | 12/2001 | Dresevic et al. ............... 707/512 |
| 2002/0059299 | A1 | | 5/2002 | Spaey |
| 2002/0059375 | A1 | | 5/2002 | Pivowar et al. |
| 2002/0161769 | A1 | * | 10/2002 | Sutinen et al. .................... 707/10 |
| 2003/0005161 | A1 | * | 1/2003 | Chen et al. ..................... 709/248 |
| 2003/0027526 | A1 | * | 2/2003 | Hillyard ........................... 455/41 |
| 2003/0115301 | A1 | | 6/2003 | Koskimies |
| 2005/0091413 | A1 | * | 4/2005 | Walbeck et al. ............... 709/251 |

FOREIGN PATENT DOCUMENTS

| EP | 1 271 360 A2 | 1/2003 |
| WO | WO 02/052793 A1 | 7/2002 |
| WO | WO 02/077860 A1 | 10/2002 |

OTHER PUBLICATIONS

"SyncML Sync Protocol, version 1.0." Dec. 7, 2000. SyncML Consortium. pp. 1-60.*
"SyncML Sync Protocor", version 1.1.1, Oct. 2, 2002.

* cited by examiner

*Primary Examiner* — Christopher Biagini
(74) *Attorney, Agent, or Firm* — Harrington & Smith

(57) ABSTRACT

The invention relates to arranging a synchronization device between a first synchronization device and a second synchronization device. A first synchronization session is set up between the first synchronization device and the second synchronization device. Role information is defined and stored for the first synchronization device to indicate whether the first synchronization device should serve as a client or a sync server in at least one subsequent synchronization session. The role information is checked when a need arises to initiate a second synchronization session between the first and the second synchronization devices. The second synchronization session is initiated from the first synchronization device in accordance with the role information.

29 Claims, 3 Drawing Sheets

ARRANGING SYNCHRONIZATION SESSION

FIELD OF THE INVENTION

The invention relates to arranging a synchronization session and especially to selecting the role of a synchronization device for a synchronization session.

BACKGROUND OF THE INVENTION

Data in portable terminals, such as portable computers, PDA (Personal Digital Assistant) devices, mobile stations or pagers, can be synchronized with the databases of network applications, desktop computer applications or other telecommunications system data bases. The data of calendar and e-mail applications in particular is typically synchronized. Synchronization has been based on the use of different proprietary protocols that do not work with each other. This has limited the number of usable terminals or data types and often been difficult for users. Especially in mobile communication, it is important to obtain and update data regardless of the used terminal and application. SyncML (Synchronization Markup Language), which is based on the XML (Extensible Markup Language) language, has been developed for the purpose of achieving a more effective synchronization of application data. Using the SyncML synchronization protocol employing SyncML-format messages, it is possible to synchronize the data of any application between any networked terminals. Solutions have also been developed to synchronize device-specific data, such as the settings of a mobile station. One device management standard is SyncML device management that is partly based on the SyncML data synchronization standard.

Earlier, only a server device was able to synchronize the data of small terminals. This was due to the fact that the functionality of a synchronization server required a higher computational and memory capacity than small portable terminals could achieve. Along with the development of the technology, it has, however, also become possible to synchronize data directly between two small, but powerful terminals, for instance two mobile stations.

BRIEF DESCRIPTION OF THE INVENTION

It is an object of the invention to develop an improved solution for arranging a synchronization session. The object of the invention is achieved by a method, synchronization system, synchronization device and computer program product that are characterized by what is stated in the independent claims. Preferred embodiments of the invention are set forth in the dependent claims.

The invention identifies a new problem in using the existing synchronization protocols: it is essential that the roles of the devices remain the same from one synchronization session to another. This has been noticed to be necessary due to the fact, for instance, that data related to earlier synchronization of the devices, such as a mapping table mapping the identifiers of data items, should preferably be stored in one device only so as to minimize the memory load. However, this requires that when the devices are synchronized with each other, one and the same device always have the role of the synchronization server and the other always the role of the client, otherwise the invalidity or lack of the data related to synchronization may result in unnecessary synchronization of data, in which all data items of the databases being synchronized (slow sync) or a number greater than necessary thereof need to be compared with each other. Assigning roles is especially difficult for a user that has several mobile stations, because s/he should remember which device to use to start the synchronization at each time. The user should at least be able to decide which of the devices to use as the server. The user may find such a question difficult and may not be able to choose right.

According to the invention, role information is defined automatically, i.e. without input from the user, and stored for the first synchronization device, the information determining whether the first synchronization device serves at least in one subsequent synchronization session as the client or the synchronization server. The role information is checked when a second synchronization session needs to be initiated between the first and second synchronization devices. The second synchronization session is initiated from the first synchronization device in accordance with the role information.

The arrangement of the invention provides the advantage that the user does not need to select the role of the device, which improves the usability of the devices. The synchronization, too, is more reliable, when the role is automatically selected correct.

According to a preferred embodiment of the invention, a first synchronization device comprising client and synchronization server functionalities can change its role, if a synchronization session cannot be initiated with the second synchronization device. The first synchronization device can transmit to the second synchronization device a client startup message, for instance a SyncML protocol sync session initialization packet of a client device, to initiate the first synchronization session. If the second synchronization device transmits an error message, the first synchronization device transmits a server initiation message to the second synchronization device. On the basis of this, synchronization server is stored for the first synchronization device as its role information. This way, the synchronization session can be initiated even though role information was not stored and the wrong role was first selected. Since the role change can be implemented on the synchronization application level, the lower-level connection need not be disconnected in the mean time.

BRIEF DESCRIPTION OF THE FIGURES

The invention will now be described in greater detail by means of the preferred embodiments and with reference to the attached drawings, in which.

DETAILED DESCRIPTION OF THE INVENTION

A few preferred embodiments of the invention are described in the following by means of synchronization according to the SyncML standard, in which user data items are typically synchronized. The invention can, however, be applied to a system employing any synchronization technology. SyncML device management that is partly based on the SyncML standard has a similar problem with the selection of roles as in SyncML data synchronization that can be solved according to a preferred embodiment of the invention. One device then typically serves as the primary device and its settings are copied to the other devices, which means that it is essential that the roles remain the same from one device management session to another.

Figure 1:
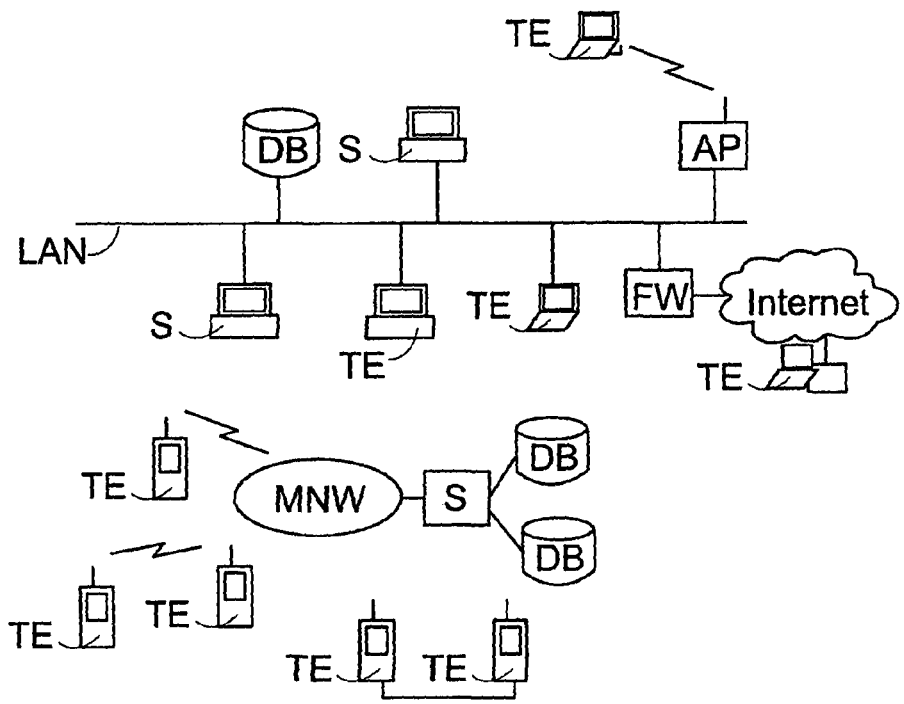
FIG. 1 is a block diagram illustrating different synchronization configurations.

FIG. 1 illustrates a networked system, in which data in its databases can be synchronized between servers S and terminals TE, between terminals TE or between servers S. The database being synchronized should be understood widely to refer to any memory means, such as memory card, hard disk or the like, or any collection of data in general, such as a database distributed in the Internet or any other data network. If the synchronization is between terminals TE or servers S, one of the terminals TE or servers S serves as a synchronization server (the SyncML synchronization server defined in the SyncML standard, which is in the following referred to as the sync server) and a second terminal TE or server S participating in the synchronization session serves as a synchronization client (SyncML client, later referred to as the client). The server S can serve several terminals TE, and one device can operate with different devices in different roles. A network server or PC (personal computer) typically serves as the server S. TE is typically a mobile station, PC, laptop computer or PDA device.

FIG. 1 shows two examples, the first of which has terminals TE and synchronization servers S connected to a local area network LAN. The terminal TE connected to the network LAN comprises functionality, for instance a network card and software controlling data transmission, for communication with the devices in the network LAN. The local area network LAN can be any type of local area network and TE can also be connected to the server S through the Internet typically using a firewall FW. The terminal TE can also be connected wirelessly to the local area network LAN through an access point AP. In the second example, the terminal TE communicates with the server S through a mobile network MNW. The terminal TE connected to the network MNW comprises mobile communication functionality for communicating wirelessly with the network MNW. There may also be other networks, such as a local area network LAN, between the mobile network MNW and the server S. The mobile network MNW can be any known wireless network, such as a network supporting GSM services, a network supporting GPRS (General Packet Radio Service) services, a third-generation mobile network, such as one according to the 3GPP ($3^{rd}$ Generation Partnership Project) network specifications, a wireless local area network WLAN or a private network. It should be noted that the server S can in itself comprise the database it synchronizes, or the database could reside in some other device; in FIG. 1, the servers S and databases DB are separate for clarity purposes. The devices synchronized with each other according to a preferred embodiment of the invention are typically devices that are quite similar, such as mobile stations, and could not earlier be synchronized with each other. In addition to the examples of FIG. 1, other synchronization configurations are also possible.

Figure 2:
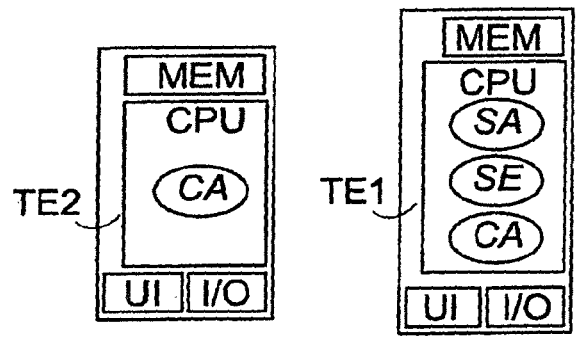
FIG. 2 is a block diagram illustrating a terminal comprising both the synchronization server and client functionalities and a terminal comprising the client functionality.

FIG. 2 illustrates two terminals TE1 and TE2 that differ in functionality and both comprise a memory MEM, a user interface UI, I/O means for arranging I/O data transmission, and a central processing unit CPU comprising one or more processors. Even though MEM, UI and CPU are marked with the same reference markings, they may naturally be different in different terminals. The memory MEM has a non-volatile portion for storing applications controlling the central processing unit CPU and other necessary information and a volatile portion for use in processing temporary data. The data to be synchronized is stored in the memories MEM (that are the databases to be synchronized) of the terminals TE1 and TE2.

In the example of FIG. 2, the first terminal TE1 comprises both the client and synchronization server functionalities for synchronization and the second terminal TE2 comprises only the client functionality. TE1 can then serve as the synchronization server during synchronization between the terminals. This situation is typical in transferring equipment-specific binding data for instance when changing to another mobile station or when using two mobile stations. The client device functionality according to the SyncML standard is made up of a client agent CA that takes care of the synchronization session-related functions in the client device. The synchronization server functionality is made up of a sync server agent SA, which manages the session, and a sync engine SE.

CA, SA and SE can be implemented by executing a computer program code stored in the memory MEM of the central processing unit CPU. Computer program codes executed in the central processing unit CPU can also cause the terminal TE1 implement the inventive functions, some embodiments of which are illustrated in more detail in FIGS. 3, 4 and 5. According to a preferred embodiment, the terminal TE1 comprising the functionalities CA, SA and SE is configured to select the role of the sync server (SA, SE) or the client device according to role information stored in advance. The computer program can be stored on any memory media, such as PC hard disk or a CD-ROM, from which it can be loaded into the memory MEM of the device TE1 for execution. It is also possible to use hardware solutions or a combination of hardware and software solutions to implement the inventive means.

The SyncML session between the sync server and the client device can be arranged for instance on the HTTP protocol (Hyper Text Transfer Protocol), WSP protocol (Wireless Session Protocol) of the WAP (Wireless Application Protocol) standard, the OBEX protocol used for cable connections, such as USB (Universal Serial Bus) or RS-232, or for short-range radio frequency (Bluetooth) or infrared (IrDA) connections, on the TCP/IP stack (Transport Control Protocol/Internet Protocol), or SMTP (Simple Mail Transfer Protocol).

Figure 3:
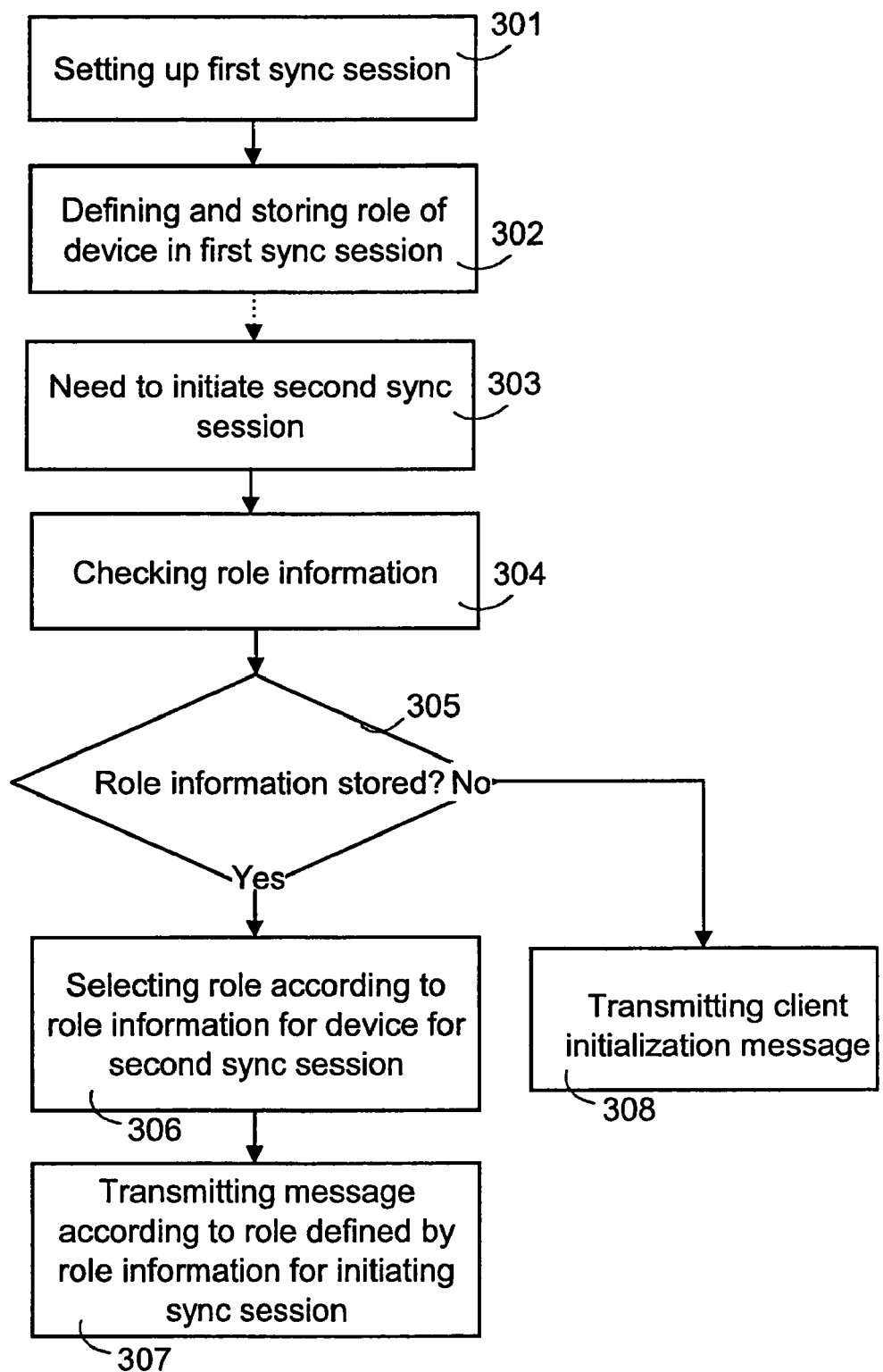
FIG. 3 is a flow chart of a method according to a preferred embodiment of the invention.

FIG. 3 is a flow chart illustrating a method of a preferred embodiment. The method can be applied to the synchronization device TE1 that comprises both the client device functionality CA and the sync server functionality SA, SE; this synchronization device is called the first sync device. The first sync session is set up 301 between the first sync device TE1 and the second sync device TE2. The data synchronized in sync sessions can be user data and/or device data. During the first sync session or after it, role information is defined and stored 302 for the first device TE1 to indicate whether the first sync device TE1 should serve as the client or sync server in the subsequent sync sessions. The role information can be stored 302 in the memory area used by the synchronization application implementing the synchronization functionality (CA, SA, SE) preferably in such a manner that the role information is associated with the identifier of the device TE2, such as the IMEI (international Mobile Equipment Identity). The first device TE1 can then store role information for every sync device with which it has set up a sync session.

When a second sync session needs 303 to be initiated with the second sync device TE2, the first sync device TE1 checks 304, 305 the role information. The role information can then be searched 304, 305 on the basis of the identifier of the device TE2, and if role information associated with the identifier is found, a role in accordance with the role information is selected 306 for the first sync device for the second sync session to be set up. The first sync device TE1 is configured to activate according to the role information either the client functionality CA or the sync server functionality SA, SE that transmits 307 a message to the second sync device TE2 to initiate the second sync session. Messages for initiating the second sync session, when using the SyncML protocol, are illustrated in more detail below.

If no role information is stored, a client initialization message can be transmitted 308, because the client device is typically assumed to initiate the sync sessions. Especially in mobile stations and other small, portable devices, the default role should preferably be client, because the sync server functionality (SE, SA) requires more processing resources and memory than the client functionality (CA). If the method is primarily applied to a device (S) serving as the sync server, but which also contains the client functionality, it is, however, also possible to transmit a message transmitted from the sync server to initiate the sync session (in the SyncML protocol "Sync Alert to Client").

The correct role is automatically selected by the embodiment illustrated above. The role information can, according to one preferred embodiment, also be application-specific, in which case the first sync device TE1 can in the synchronization performed by a specific application serve as the sync server to the second device, whereas in the synchronization performed by another application, the second device serves as the server to the first sync device TE1. The role information can also vary even within one application, depending for instance on the profile used by the application. The important thing is that the role is defined and stored for the next corresponding sync session.

According to one embodiment, the role information is not stored if in step 302, client is defined as the role. Even in this case, it is possible to act as in FIG. 3 in the next synchronizations and to select client as the default role. This way, it is possible to further reduce memory consumption without, however, endangering the operation of the invention, since according to the SyncML synchronization protocol, for instance, the client device initiates the sync session.

Figure 4:
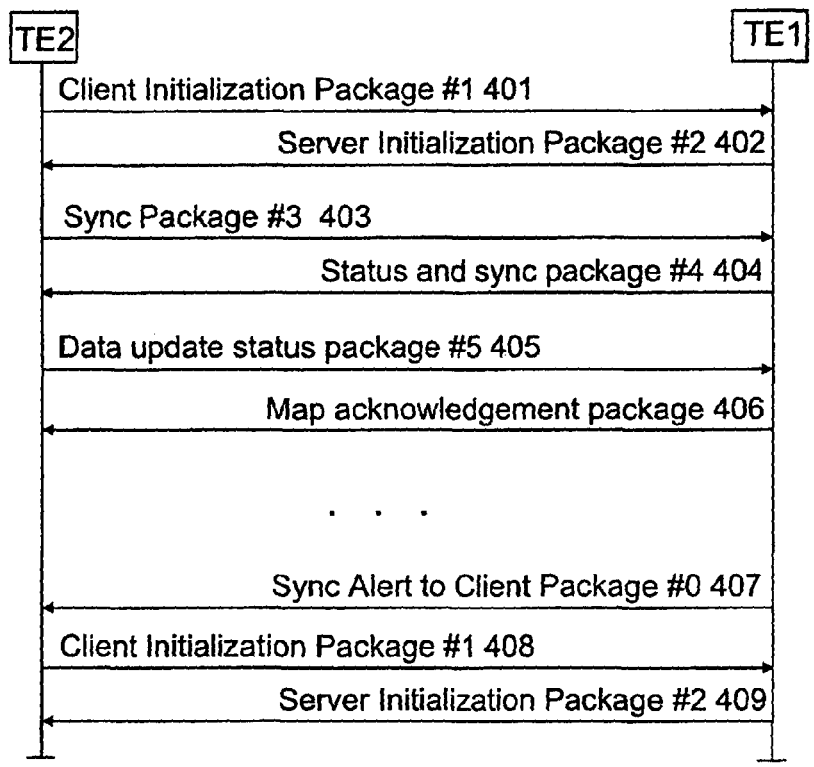
FIG. 4 is a signalling diagram illustrating the arrangement of synchronization sessions according to one embodiment in a SyncML system.

FIG. 4 is a signalling diagram illustrating the arrangement of sync sessions in a SyncML system. According to the SyncML standard, when initiating a sync session, the initialization of the sync session is performed first. This means that the device TE2 comprising the client functionality transmits a client initialization package (package #1) 401 to the device TE1 comprising the sync server and client functionalities. When TE1 receives the message 401, it detects that it should serve as the sync server, and it transmits a server initialization package (package #2) 402 to the client device TE2. Authentication between the client device and sync server, the definition of the databases to be synchronized, the definition of the protocol type and the exchange of the service and device properties affecting synchronization can be performed during the initialization.

When the sync session is inititalized, the client device TE2 can transmit to the sync server TE1 a SyncML package (package #3) 403 that contains at least information on the changes and additions made to the selection data set containing user data items and/or device data items in the client device after the previous sync session, for instance an e-mail message added to the set. It should be noted that in SyncML synchronization, it is possible depending on the selected synchronization type to transmit to the other party all the data being synchronized or only the changes made to the data being synchronized after the previous sync session. The sync server TE1 synchronizes the data, i.e. analyses the changes made to the selection data set and harmonizes (adds, replaces and deletes) the user data items and/or device data items. After this, the sync server TE1 transmits to the client device TE2 a message (package #4) 404 that contains information on the results of the synchronization and in two-way synchronization also information on any changes made to the database of TE1 (Sync Package from Server). If the synchronization is two-way, TE2 updates its database on the basis of the message 404 and possibly allocates LUID identifiers (Locally Unique Identifier) to new data items. TE2 transmits to the sync server TE1 a message (package #5) 405 that comprises status information and possibly mapping information indicating LUID identifiers. The sync server TE1 updates the mapping table of the user data and/or device data items as necessary on the basis of the message 405 and transmits to the client device a message (package #6) 406 that contains an acknowledgement for the mapping information (Map Acknowledgement from Server). According to one preferred embodiment, this mapping information describing the sameness of the data items is only stored in the device (TE1) having the role of sync server. This way, it is possible to avoid maintaining several mapping tables for the same devices and the conflicts that arise from their differences.

TE1 stores for instance during the initialization phase after the message 401 or after the ending of the sync session (after the message 406) the role information, which is not shown in FIG. 4. As illustrated in FIG. 3, when there is a need to set up a second sync session from TE1 to TE2, TE1 defines the role information and on the basis of it transmits a server functionality SA message 407 (Sync Alert to Client Package #0) for initiating the initialization of the sync session. The client device functionality CA of TE2 detects the message and starts the initialization of the sync session according to the SyncML standard by message 408 (Client Initialization Package #1) as already illustrated in connection with the message 401. TE1 responds to the message 408 by a message 409 (Server Initialization Package #2), after which the second sync session is initialized and synchronization according to the synchronization type can be performed, which is not illustrated in FIG. 4.

Figure 5:
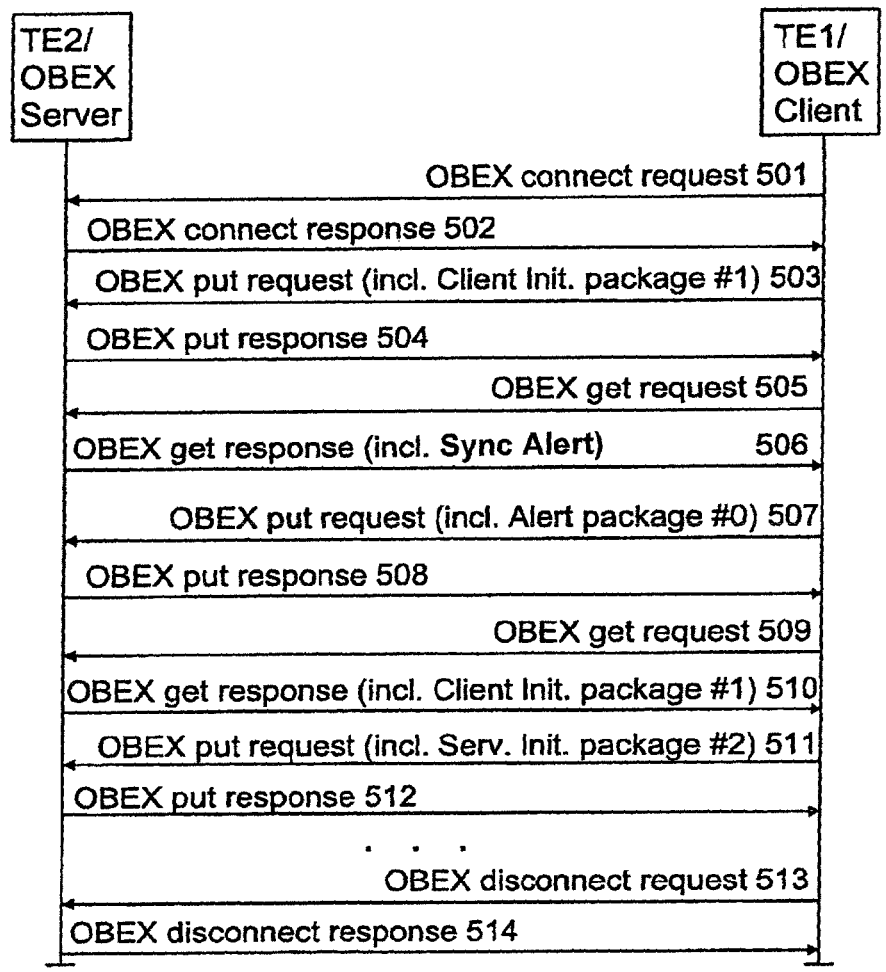
FIG. 5 is a signalling diagram illustrating a role change according to one embodiment in a SyncML system.

FIG. 5 illustrates a role change in an embodiment, in which transport service is provided by the OBEX protocol under the SyncML protocol. An OBEX connection is set up between TE1 and TE2 initiated by TE1 with messages 501 (OBEX connect request) and 502 (OBEX connect response). TE1 thus serves as the OBEX client device and TE2 as the OBEX server. If a role has not been defined for synchronization with TE2 in the synchronization device TE1 comprising the client and sync server functionalities, TE1 initiates the sync session with the default role, as the client. The initiating role can also be selected on the basis of user input. The OBEX message 503 (OBEX put request) then contains the client sync initialization package (e.g. SyncML Client initialization Package #1). TE2 transmits an OBEX response message 504 (OBEX put response), in response to which TE1 transmits an OBEX request 505 (OBEX get request).

According to one preferred embodiment, the first sync device TE1 transmits to the second sync device TE2 a client initialization package to initiate a first sync session. Because TE2 cannot serve as a sync server, it responds by a message 506 (OBEX get response) that contains a SyncML package comprising an error code (Sync Alert).

When the error message 506 is received from the second sync device TE2, TE1 knows that TE2 is not capable of serving as the sync server. The first sync device TE1 can then automatically change its role to sync server. TE1 then in response to the error message transmits to the second sync device TE2 a sync server request for sync session initialization, i.e. in the example of FIG. 5, the OBEX request 507 that contains a SyncML package (e.g. SyncML Sync Alert to Client Package #0).

TE2 responds with an OBEX response 508, to which TE1 responds by an OBEX request 509. The SyncML client functionality CA of TE2 can operate according to the SyncML protocol after having received the SyncML package (e.g. SyncML Sync Alert to Client Package #0). TE2 transmits an OBEX response 510 that contains a client synchronization initialization package (Client Initialization Package #1). TE1 responds by an OBEX message 511 containing a sync server initialization package (Package #2), to which TE2 responds by a message 512. After this, data can be synchronized according to the synchronization type, which is not shown in FIG. 5. After the synchronization is done, the OBEX connection can be released with messages 513 (OBEX disconnect request) and 514 (OBEX disconnect response).

It should be noted that even though TE1 changed roles on the SyncML protocol level, the connection according to the protocol (the OBEX protocol in the example of FIG. 5) on the lower level need not be disconnected according to a preferred embodiment. This eliminates the need for transmitting messages related to disconnecting and re-establishing the connection.

Due to the role change, the first sync device TE1 stores sync server as the role information for synchronization with the second sync device TE2 as described above. Then, when a need arises to set up a later sync session with the second sync device TE2, TE1 can function as illustrated in FIGS. 3 and 4 and select sync server as its role in accordance with the role information.

According to one embodiment, role definition is based on memory space or the performance of the devices, or some other property of the devices, such as the software version running in them. In this embodiment, either device could serve as the sync server, but the device that has more memory is selected as the server. One way of implementing this embodiment is that if the sync device does not have a lot of memory available when it receives the client initialization message, the device transmits the error code 506 as response (even though it could serve as the sync server).

If the devices do not synchronize directly, but have between them a device transferring synchronization messages (router), this router can preferably store role information associated with the devices and perform at least some of the steps illustrated in FIG. 3. This provides an advantage in a situation, for instance, in which two mobile stations or other sync devices are connected to a personal computer, for instance. There may be no other data transmission means between these two sync devices than this computer. In such a situation, the computer can initiate the synchronization, whereby it defines the roles for the sync devices and transmits the appropriate initialization messages to them. Alternatively, two sync devices can have some other kind of indirect synchronization connection, and a device connected to the Internet or some other data network, for instance, can also serve as the synchronization router. Then, too, the role information of the synchronized devices should preferably be stored in this assisting device.

One advantage of the embodiments illustrated above is that the sync session and its initialization can be arranged using messages already defined in the SyncML standard, so no changes are required in the SyncML standard because of the invention. With respect to the SyncML protocol and its messages, reference is made to the SyncML Initiative group SyncML specification "*SyncML Sync Protocol, version 1.1.1*", 63 pages, 2 Oct. 2002.

It is obvious to a person skilled in the art that while the technology advances, the basic idea of the invention can be implemented in many different ways. The invention and its embodiments are thus not restricted to the examples described above, but can vary within the scope of the claims.

The invention claimed is:

1. A method comprising:
    establishing a first synchronization session between a first synchronization device and a second synchronization device, each synchronization device comprising a processor and memory, by transmitting a client initialization message from the first synchronization device to the second synchronization device,
    receiving a response at the first synchronization device from the second synchronization device, the response comprising one of an acknowledgement or an error,
    defining automatically based on the response and storing role information on the first synchronization device, which indicates whether the first synchronization device should serve as a synchronization client or a synchronization server in at least one subsequent synchronization session,
    wherein when the response comprises an acknowledgement, synchronization client is stored as the role information,
    wherein when the response comprises an error, the first synchronization device changes its role and stores synchronization server as the role information,
    checking said role information for the first synchronization device in response to a need for initiating a second synchronization session between the first synchronization device and the second synchronization device, and
    initiating the second synchronization session from the first synchronization device in accordance with said role information, wherein a client initialization message to initiate the second synchronization session with a synchronization server is transmitted from the first synchronization device to the second synchronization device in response to synchronization client being defined in the role information as the role of the first synchronization device and a server message to alert the second synchronization device to send a client initialization message is transmitted from the first synchronization device to the second synchronization device in response to synchronization server being defined in the role information as the role of the first synchronization device,
    wherein both devices are able to serve as a synchronization server, and wherein a device serving as a synchronization server analyzes changes made to data sets associated with synchronization sessions and harmonizes data items in the data sets.

2. A method as claimed in claim 1, wherein a client initialization message for initiating the first synchronization session is transmitted from the first synchronization device to the second synchronization device,
    an error message is received from the second synchronization device,
    a server initialization message is transmitted from the first synchronization device to the second synchronization device in response to the error message, and
    synchronization server is stored, during the role information storing, as the role information for the first synchronization device.

3. A method as claimed in claim 1, wherein a client initialization message for initiating the first synchronization session is transmitted from the first synchronization device to the second synchronization device, an acknowledgement is received from the second synchronization device,
in response to receiving the acknowledgement, synchronization client is stored, during the role information storing, as the role information for the first synchronization device.

4. A method as claimed in claim 1, wherein the role information is associated with the second synchronization device on the basis of an identifier of the second synchronization device, and
the role information associated with the identifier of the second synchronization device is searched from the stored role information in the first synchronization device in response to a need to initiate a second synchronization session with the second synchronization device.

5. A method as claimed in claim 1, wherein said role information is application-specific so that separate role information is stored in the first synchronization device for each application and/or application profile in the first synchronization device.

6. A method as claimed in claim 1, wherein said role information is stored in a third device that is other than said first or second synchronization device.

7. A method as claimed in claim 1, further comprising storing mapping information describing sameness of data items only on the synchronization device, the role of which is synchronization server.

8. A method as claimed in claim 1, wherein data being synchronized is one of the following: user data, device data.

9. A method as claimed in claim 1, wherein the first synchronization device and the second synchronization device support a synchronization markup language standard.

10. A method as claimed in claim 1, wherein a role is selected for the first synchronization device for the second synchronization session on the basis of said role information; and the second synchronization session is initiated from the first synchronization device in accordance with the selected role.

11. A synchronization system comprising at least a first synchronization device and a second synchronization device, wherein each synchronization device comprises a processor and memory, wherein the first synchronization device and the second synchronization device are configured to set up a first synchronization session by transmitting a client initialization message from the first synchronization device to the second synchronization device,
wherein the first synchronization device receives a response from the second synchronization device, the response comprising one of an acknowledgement or an error,
the first synchronization device is configured to automatically define based on the response and store role information that indicates whether the first synchronization device should serve as a synchronization client or a synchronization server in at least one subsequent synchronization session,
wherein when the response comprises an acknowledgement, synchronization client is stored as the role information,
wherein when the response comprises an error, the first synchronization device changes its role and stores synchronization server as the role information,
the first synchronization device is configured to check said role information in response to a need for initiating a second synchronization session between the first synchronization device and the second synchronization device, and
the first synchronization device is configured to initiate the second synchronization session in accordance with said role information, wherein the first synchronization device is configured to transmit a client initialization message to the second synchronization device in response to synchronization client being defined in the role information as the role of the first synchronization device and the first synchronization device is configured to transmit a server message to the second synchronization device to alert the second synchronization device to send a client initialization message in response to synchronization server being defined in the role information as the role of the first synchronization device,
wherein both devices are able to serve as a synchronization server, and wherein a device serving as a synchronization server analyzes changes made to data sets associated with synchronization sessions and harmonizes data items in the data sets.

12. A synchronization system as claimed in claim 11, wherein said role information is stored in a third device that is other than said first or second synchronization device.

13. A synchronization system as claimed in claim 11, wherein a role is selected for the first synchronization device for the second synchronization session on the basis of said role information; and the second synchronization session is initiated from the first synchronization device in accordance with the selected role.

14. A synchronization system as claimed in claim 11, wherein the first synchronization device is configured to transmit to the second synchronization device a client initialization message for initiating the first synchronization session,
the first synchronization device is configured to receive an error message from the second synchronization device,
the first synchronization device is configured to transmit to the second synchronization device a server initialization message in response to the error message, and
the first synchronization device is configured to store, during the role information storing, synchronization server as the role information for the synchronization device.

15. A synchronization system as claimed in claim 11, wherein the first synchronization device is configured to store mapping information describing sameness of data items only if synchronization server is defined as its role.

16. A synchronization device comprising a processor and memory that is configured to set up a first synchronization session with a second synchronization device comprising a second processor and second memory, wherein the synchronization device comprises hardware,
wherein the synchronization device sets up the first synchronization session by transmitting a client initialization message to the second synchronization device,
wherein the synchronization device receives a response from the second synchronization device, the response comprising one of an acknowledgment or an error,
wherein the synchronization device is configured to automatically define based on the response and store role information that indicates whether the synchronization device should serve as a synchronization client or a synchronization server in at least one subsequent synchronization session,
wherein when the response comprises an acknowledgement, synchronization client is stored as the role information, wherein when the response comprises an error, the synchronization device changes its role and stores synchronization server as the role information, the synchronization device is configured to check said role information in response to a need for initiating a second synchronization session with the second synchronization device, and the synchronization device is configured to initiate the second synchronization session in accordance with said role information, wherein the synchronization device is configured to transmit a client initialization message to the second synchronization device in response to synchronization client being defined in the role information as the role of the synchronization device and the synchronization device is configured to transmit a server message to the second synchronization device to alert the second synchronization device to send a client initialization message in response to synchronization server being defined in the role information as the role of the synchronization device, wherein both devices are able to serve as a synchronization server, and wherein a device serving as a synchronization server analyzes changes made to data sets associated with synchronization sessions and harmonizes data items in the data sets.

17. A synchronization device as claimed in claim 16, wherein the synchronization device is configured to transmit to the second synchronization device a client initialization message for initiating the first synchronization session, the synchronization device is configured to receive an error message from the second synchronization device, the synchronization device is configured to transmit to the second synchronization device a server initialization message in response to the error message, and the synchronization device is configured to store, during the role information storing, synchronization server as the role information for the synchronization device.

18. A synchronization device as claimed in claim 16, wherein the synchronization device is configured to store mapping information describing sameness of data items only if synchronization server is defined as its role.

19. A synchronization device as claimed in claim 16, wherein a role is selected for the synchronization device for the second synchronization session on the basis of said role information; and the second synchronization session is initiated from the synchronization device in accordance with the selected role.

20. A non-transitory computer readable storage medium encoded with a computer program comprising:

a program code portion for controlling a synchronization device to set up a first synchronization session with a second synchronization device by transmitting a client initialization message to the second synchronization device, wherein the first and second synchronization devices each comprise a processor and memory, a program code portion for receiving a response from the second synchronization device, the response comprising one of an acknowledgement or an error, a program code portion for controlling the synchronization device to automatically define based on the response and store role information that indicates whether the synchronization device should serve as a synchronization client or a synchronization server in at least one subsequent synchronization session, wherein when the response comprises an acknowledgement, synchronization client is stored as the role information, wherein when the response comprises an error, the synchronization device changes its role and stores synchronization server as the role information, a program code portion for controlling the synchronization device to check said role information in response to a need for initiating a second synchronization session with the second synchronization device, and a program code portion for controlling the synchronization device to initiate the second synchronization session in accordance with said role information, wherein the program code is configured to control the synchronization device to transmit a client initialization message to the second synchronization device in response to synchronization client being defined in the role information as the role of the synchronization device and the program code is configured to control the synchronization device to transmit a server message to the second synchronization device to alert the second synchronization device to send a client initialization message in response to synchronization server being defined in the role information as the role of the synchronization device, wherein both devices are able to serve as a synchronization server, and wherein a device serving as a synchronization server analyzes changes made to data sets associated with synchronization sessions and harmonizes data items in the data sets.

21. A synchronization apparatus comprising:

a memory including computer program code; and at least one processor, wherein the memory and the computer program code are configured to, with the at least one processor, cause the synchronization apparatus at least to set up a first synchronization session with a second synchronization apparatus comprising a second processor and second memory by transmitting a client initialization message to the second synchronization apparatus, receive a response from the second synchronization apparatus, the response comprising one of an acknowledgement or an error, automatically define, based on the response, and store role information that indicates whether the synchronization apparatus should serve as a synchronization client or a synchronization server in at least one subsequent synchronization session, wherein when the response comprises an acknowledgement, synchronization client is stored as the role information, wherein when the response comprises an error, the synchronization apparatus changes its role and stores synchronization server as the role information, check said role information in response to a need for initiating a second synchronization session with the second synchronization apparatus, and initiate the second synchronization session in accordance with said role information, wherein the synchronization apparatus is configured to transmit a client initialization message to the second synchronization apparatus in response to synchronization client being defined in the role information as the role of the synchronization apparatus and the synchronization apparatus is configured to transmit a server message to the second synchronization apparatus to alert the second synchronization apparatus to send a client initialization message in response to synchronization server being defined in the role information as the role of the synchronization apparatus, wherein both apparatus are able to serve as a synchronization server, and wherein an apparatus serving as a synchronization server analyzes changes made to data sets associated with synchronization sessions and harmonizes data items in the data sets.

22. A synchronization apparatus as claimed in claim 21, wherein the synchronization apparatus is configured to receive an error message from the second synchronization apparatus, and the synchronization apparatus is configured to transmit to the second synchronization apparatus a server initialization message in response to the error message.

23. A synchronization apparatus as claimed in claim 21, wherein a client initialization message for initiating the first synchronization session is transmitted from the synchronization apparatus to the second synchronization apparatus, an acknowledgement is received from the second synchronization apparatus, in response to receiving the acknowledgement, synchronization client is stored during the role information storing as the role information for the synchronization apparatus.

24. A synchronization apparatus as claimed in claim 21, wherein the role information is associated with the second synchronization apparatus on the basis of an identifier of the second synchronization apparatus, and the role information associated with the identifier of the second synchronization apparatus is searched from the stored role information in the synchronization apparatus in response to a need to initiate a second synchronization session with the second synchronization apparatus.

25. A synchronization apparatus as claimed in claim 21, wherein said role information is application-specific so that separate role information is stored in the synchronization apparatus for each application and/or application profile in the synchronization apparatus.

26. A synchronization apparatus as claimed in claim 21, wherein said role information is stored in a third apparatus that is other than said synchronization apparatus or second synchronization apparatus.

27. A synchronization apparatus as claimed in claim 21, wherein the at least one processor and memory further cause the synchronization apparatus to store mapping information describing sameness of data items on the synchronization apparatus when the role of which is synchronization server.

28. A synchronization apparatus as claimed in claim 21, wherein the synchronization apparatus and the second synchronization apparatus support a synchronization markup language standard.

29. A synchronization apparatus as claimed in claim 21, wherein the synchronization apparatus is a mobile station.

* * * * *